(12) United States Patent
Kersjes et al.

(10) Patent No.: US 6,460,411 B1
(45) Date of Patent: Oct. 8, 2002

(54) FLOW SENSOR COMPONENT

(75) Inventors: Ralf Kersjes, Duisburg (DE); Wilfried Mokwa, Krefeld (DE); Günter Zimmer, Duisburg (DE); Holger Vogt, Mülheim (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/355,836

(22) PCT Filed: Feb. 14, 1997

(86) PCT No.: PCT/EP97/00708

§ 371 (c)(1),
(2), (4) Date: Aug. 3, 1999

(87) PCT Pub. No.: WO98/36247

PCT Pub. Date: Aug. 20, 1998

(51) Int. Cl.[7] .................................................. G01F 1/68
(52) U.S. Cl. .................................................... 73/204.26
(58) Field of Search ............................. 73/204–204.26, 73/116

(56) References Cited

U.S. PATENT DOCUMENTS

| | | | |
|---|---|---|---|
| 4,297,881 A | * 11/1981 | Sassayama et al. | 73/204 |
| 4,581,928 A | * 4/1986 | Johnson | 73/204 |
| 4,680,963 A | 7/1987 | Osamu et al. | |
| 4,825,693 A | * 5/1989 | Buhrer et al. | 73/204.25 |
| 4,888,988 A | * 12/1989 | Lee et al. | 73/204.26 |
| 5,291,781 A | * 3/1994 | Nagata et al. | 73/204.26 |
| 5,765,432 A | * 6/1998 | Lock et al. | 73/204.11 |

FOREIGN PATENT DOCUMENTS

| | | |
|---|---|---|
| DE | 4042334 A1 | 5/1991 |
| EP | 0490764 A | 7/1992 |

OTHER PUBLICATIONS

A. Kersjes et al., "A Fast Liquid Flow Sensor with Thermal Isolation by Oxide–Filled Trenches", Sensors and Actuators A, vol. A47, Nr. 1/03, Mar. 1995, pp. 373–379.
J. Werno et al., "Reduction of Heat Loss of Silicon Membranes by the Use of Trench–Etching Techniques", Sensors and Actuators A., vol. 41–42, Apr. 15, 1994, pp. 578–581.
Patent Abstracts of Japan, vol. 018, No. 384 (P–1772), Jul. 19, 1994, and JP 06109507A Oct. 4, 1994.

* cited by examiner

*Primary Examiner*—Benjamin R. Fuller
*Assistant Examiner*—Jewel V. Thompson
(74) *Attorney, Agent, or Firm*—Dougherty & Clements LLP

(57) ABSTRACT

A flow sensor component consists of a diaphragm of monocrystalline silicon, the diaphragm having arranged therein filled slots which are filled with a thermally insulating material and which penetrate the diaphragm from a first main surface to a second main surface thereof. The filled slots defining at least one heating area of the diaphragm provided with at least one heating element and at least one detection area of the diaphragm provided with at least one temperature detection element, the filled slots thermally insulating the heating area and the detection area from one another and surrounding the heating area and the detection area completely.

12 Claims, 3 Drawing Sheets

FLOW SENSOR COMPONENT

BACKGROUND OF THE INVENTION

1. Field of the Invention

The present invention relates to thermal semiconductor flow sensors with direction recognition for liquids and gases and, in particular, to a silicon flow sensor component for such flow sensors.

Silicon technology-based sensors have promising properties for many measurement applications. They have, for example, small dimensions, they can be mass-produced at a reasonable price and they permit the monolithic integration of read-out electronics. Silicon flow sensors additionally offer the advantage of short response times and of a low power consumption. In the production process of the silicon sensors, integration of the electronics is, however, only possible if process steps, which are compatible with the production methods of microelectronics, are used for this integration of the electronics.

2. Description of Prior Art

Silicon technology-based flow sensors are known, which operate on the basis of pressure-difference measurements. Such flow sensors are described e.g. in S. T. Cho, K. Najafi, C. E. Lowman and K. D. Wise: An ultrasensitive silicon pressure-based microflow sensor, IEEE Transaction on Electron Devices, Vol. 39, No. 4 (1992) 825–835.

J. Braneberg, O. J. Jensen, N. G. Laursen, O. Leistiko and H. Soeberg: A micromachined flow sensor for measuring small liquid flows, Proc. 6th Int. Conf. Solid-State Sensors and Actuators (Transducers 1991) San Francisco, Calif., USA, Jun. 24 to 27, 1991, pp. 41–44, describe flow sensors operating on the principle of transit-time measurement with thermal marking. Furthermore, flow sensors are known operating on the basis of the thermal principles according to the hot-film anemometer principle. Most of the sensors of the type described hereinbefore have been used for the flow measurement of gases up to now.

In the following, known solution approaches, which are similar to the hot-film or hot-wire anemometer principle, will be described. The hot-film anemometer principle is based on the cooling down of heated structures by flowing media which are in contact with these structures. The cooling down of the heated structures depends on the flow rate of the medium.

First silicon flow sensors were already described between 1970 and 1980. R. W. M. van Riet and J. H. Huijsing: Integrated direction-sensitive flowmeter; Electronic Letters, 1976, Vol. 12, No. 4, pp. 647–648, describe a flow sensor in the case of which two transistors, which serve as temperature sensors, are arranged on a silicon substrate before and after a transistor, when seen in the direction of flow, the central transistor serving as a heating element. In this flow sensor, the signal difference between the two temperature sensors, which are arranged before and after the heating element, when seen in the direction of flow, is a measure of the flow rate of a medium flowing past the flow sensor.

A similar set-up making use of Wheatstone bridges of ion-implanted resistors is described in A. F. P. van Putten and S. Middlehoek: Integrated silicon anemometer; Electronic Letters, Vol. 10 (1974), pp. 425–426. With regard to more extensive examinations of such sensors, reference is also made to A. F. P. van Putten: An integrated silicon double bridge anemometer, Sensors and Actuators, Vol. 4 (1983), pp. 387–396; and J. I. Huijsing, J. P. Schuddemat and W. Verhoef: Monolithic integrated direction sensitive flow sensor; IEEE Trans. Electron Devices, Vol. ED-29 (1982) No. 1, pp. 133–136.

In such known flow sensors, the sensitivity was low, since a thermally good contact exists between the heating element and the temperature sensors via the silicon chip which has a good thermal conductivity. The sensitivity depends also strongly on the structural design. Hence, structures have been developed which provide a better thermal insulation between the two sensors and the heating element. The detection of the flow-dependent percentage of the heat entering the medium can be improved in this way.

R. G. Johnson and R. E. Higashi: A highly sensitive silicon chip microtransducer for air flow and differential pressure sensing applications; Sensors and Actuators, Vol. 11 (1987), pp. 63–72, discloses a flow sensor with a freestanding silicon nitride bridge which is anisotropically undercut on the front side thereof. On this silicon nitride bridge, heating elements and temperature sensors are arranged, which are based on metal resistors. A disadvantage of such an undercut structure is, however, that it is sensitive to e.g. dust and oil particles.

M. Stenberg, G. Stemme and G. Kittisland: A silicon sensor for measurement of liquid flow and thickness of fouling biofilms, Sensors and Actuators, 13 (1988), 203–221, disclose a solution approach in which the thermal insulation between heating elements and temperature detection elements is accomplished by means of a polyimide. In this silicon sensor a thin tongue is etched out of the back of a chip; with the exception of the conductor tracks and an oxide layer on the back, the tip of the tongue is separated from the tongue by means of a front etching process. The resultant V-shaped indentation is filled with a polyimide for the purpose of stabilization. The tip has provided thereon a heating element and a diode for temperature measurement. A disadvantage of such a system is the dependence of the thermal conductivity on outer influences, e.g. humidity, acting on the polyimide.

A flow sensor provided with a diaphragm formed by back-etching from a block of fully oxidized porous silicon and making use of platinum resistors, is described in O. Tabata: Fast response silicon flow sensor with an on-chip fluid temperature sensing element; IEEE Trans. Electron. Devices, Vol. ED-33 (1986), pp. 297–302. The structure described in this publication has a smooth surface and offers therefore no direct hold for particles or an impact pressure; it does, however, not permit an integration of microelectronic components in the diaphragm.

In addition flow sensors are known, which are constructed with the aid of freestanding polysilicon bridges on a chip surface. The layer used as a sacrificial layer below the polysilicon bridge is e.g. phosphorus silicate glass. In the central area of the polysilicon bridge, there is a lightly doped region, which serves as a flow-sensitive heated resistor, the rest of the bridge being heavily doped and acting as an electric conductor. A flow sensor consisting of a silicon diaphragm, which is freely suspended from four arms so that it is thermally insulated, is disclosed in B. W. van Oudheusden, A. W. van Herwaarden: High-sensitivity 2-D flow sensor with an etched thermal insulation structure; Sensors and Actuators, A21–A23 (1990) 425–430. Temperature difference measurement is here carried out via a thermopile.

E. Yoon, K. D. Wise: An integrated mass flow sensor with on-chip CMOS interface circuits; IEEE Transactions on Electron. Devices, Vol. 39, No. 6 (1992) 1376–1386; R. G.

Johnson and R. E. Higashi: A highly sensitive silicon chip microtransducer for air flow and differential pressure sensing applications; Sensors and Actuators, Vol. 11 (1987), pp. 63–72; as well as T. R. Ohnstein, R. G. Johnson, R. E. Higashi, D. W. Burns, J. O. Holmen, E. A. Satren, G. M. Johnson, R. Bicking and S. D. Johnson: Environmentally rugged, wide dynamic range microstructure airflow sensor; IEEE Solid-State Sensor and Actuator Workshop Tech. Digest (1990), Hilton Head Island, S.C., describe monolithically integrated flow sensors for gases provided with the necessary electronics. For reasons of robustness, a diaphragm formed by back-etching and consisting of oxide has been used as a flow-sensitive element also in these flow sensors. The metallization of the chip consists of gold and chromium. Also the temperature-sensitive elelements are formed by Au—Cr thin-film resistors.

Deviating from the above-described sensors, the publication O. Tabata: Fast response silicon flow sensor with an on-chip fluid temperature sensing element; IEEE Trans. Electron. Devices, Vol. 33 (1986), pp. 297–302, describes a flow sensor in the case of which the oxide diaphragm is not produced by oxidation from porous silicon, but by an LPCVD nitride/oxide stack of layers (LPCVD=Low Pressure Chemical Vapour Deposition). This sensor has integrated therein a gas sensor and a pressure sensor in addition to the flow sensor.

D. Moser, R. Legenhager and H. Baltes: Silicon gas flow sensors using industrial CMOS and bipolar IC technology; Sensors and Actuators, A27 (1991), pp. 577–581, disclose gas flow sensors with integrated electronics, based on CMOS processes on the one hand and on bipolar processes on the other. In the CMOS-compatible flow sensor, an aluminium/polysilicon thermopile is arranged on an oxide tongue, which was left behind when a V-shaped indentation was formed by front-etching. In the case of the sensors, which are produced making use of bipolar processes, the tongue is etched from an n-doped, epitaxial silicon, the thermopile consisting of aluminium and p-doped epi-silicon. DE 4338891 describes flow sensors making use of two silicon diaphragms.

References concerning the use of silicon flow sensors in liquids can only be found recently. Flow sensors with individual diaphragms without any possibility of direction recognition are, for example, described in R. Kersjes, J. Eichholz, A. Langerbein, Y. Manoli and W. Mokwa: An integrated sensor for invasive blood-velocity measurement, Sensors and Actuators A, 37–38 (1993) 674–678; R. Kersjes, W. Mokwa: A fast liquid flow sensor with themal isolation by oxide filled trenches, Book of Abstracts, Eurosensors VIII Conference, Toulouse, France, Sep. 25 to 28, 1994.

In A. J. van der Wiel, A. C. Hoogerwerf and N. F. de Roij: A calorimetic mass-flow sensor for hostile environments, Proc. 7th International conference on Solid State Sensors and Actuators, Yokohama, Japan, Jun. 7–10, 1993; A. J. van der Wiel, C. Linder and N. F. de Rooij: A liquid flow sensor based on the hot-wire principle; Sensors and Actuators, Proc. Eurosensors 1992, San Sebastian, Spain; and T. S. J. Lammerink, N. R. Tas, M. Elwenspoek and J. H. J. Fluitman: Microliquid flow sensor, Sensors and Actuators A, 37–38 (1993), 45–50, flow sensors are described which heat a silicon diaphragm. Due to the flow of the medium in a specific direction, an asymmetric temperature variation is obtained in the monocrystalline silicon diaphragm. The measurement of this temperature asymmetry with the aid of two temperature sensors provides then a flow-dependent measure as well as a flow direction-dependent measure. The sensitivity of these sensors is, however, low.

SUMMARY OF THE INVENTION

It is an object of the present invention to provide a robust flow sensor component with good thermal insulation between the heating areas and the temperature detection areas.

This object is achieved by a flow sensor component consisting of a diaphragm of monocrystalline silicon, the diaphragm having arranged therein filled slots which are filled with a thermally insulating material and which penetrate the diaphragm from a first main surface to a second main surface thereof, the slots open at both ends defining at least one heating area of the diaphragm provided with at least one heating element and at least one detection area of the diaphragm provided with at least one temperature detection element, the filled slots thermally insulating the heating area and the detection area from one another and surrounding the heating area and the detection area completely.

A preferred embodiment of the present invention consists of thermal silicon flow sensors in the case of which diaphragms formed by back-etching are provided with filled slots which are preferably filled with a dielectric material, the filled slots being used for thermally insulating different areas of the diaphragm. Hence, these diaphragms consist of a combination of monocrystalline silicon and additional filled slots which are preferably filled with a dielectric material, e.g. silicon oxide or silicon nitride. The filled slots can be referred to as filled layers also in the German language. Possible manufacturing processes for forming such filled slots in silicon diaphragms are disclosed e.g. in the PCT application having the serial number PCT/DE91/00162 and owned by the applicant of the present application.

The present invention combines the advantages of the use of silicon diaphragms and of diaphragms of dielectric material, e.g. silicon nitride and silicon oxide, with the possibility of flow direction measurement. The silicon diaphragm has the advantage that it can have a robust structural design and that it additionally permits the integration of temperature-sensitive electronic components in the diaphragm. The use of filled slots permits, in addition, an increase in the sensitivity by better thermal insulation of e.g. heating elements and thermal detection elements. When the flow sensor component according to the present invention is used, a dielectric passivation of the heating elements, of the temperature detection elements and of additional electronic components can be provided so as to avoid short circuits.

BRIEF DESCRIPTION OF THE DRAWINGS

In the following, preferred embodiments of the present invention will be explained in more detail making reference to the drawings enclosed, in which.

DESCRIPTION OF PREFERRED EMBODIMENTS OF THE INVENTION

Figure 1:
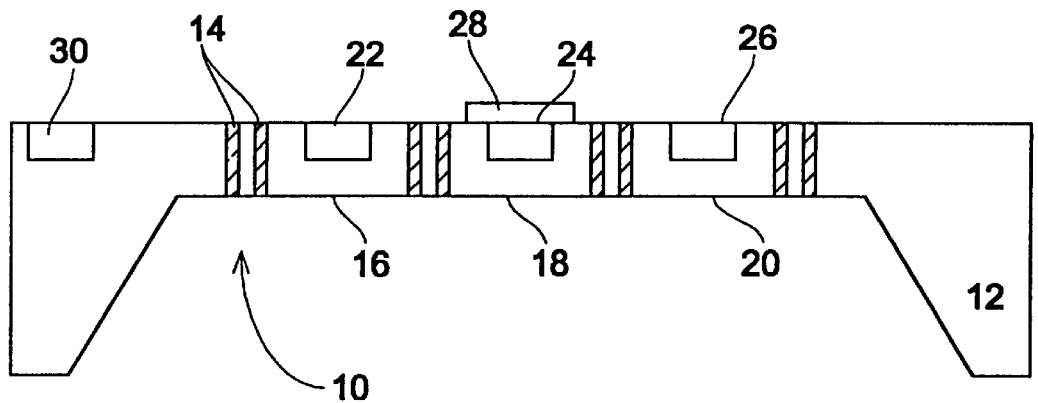
FIG. 1 shows a schematic cross-sectional view of an embodiment of a flow sensor component according to the present invention.
Figure 2:
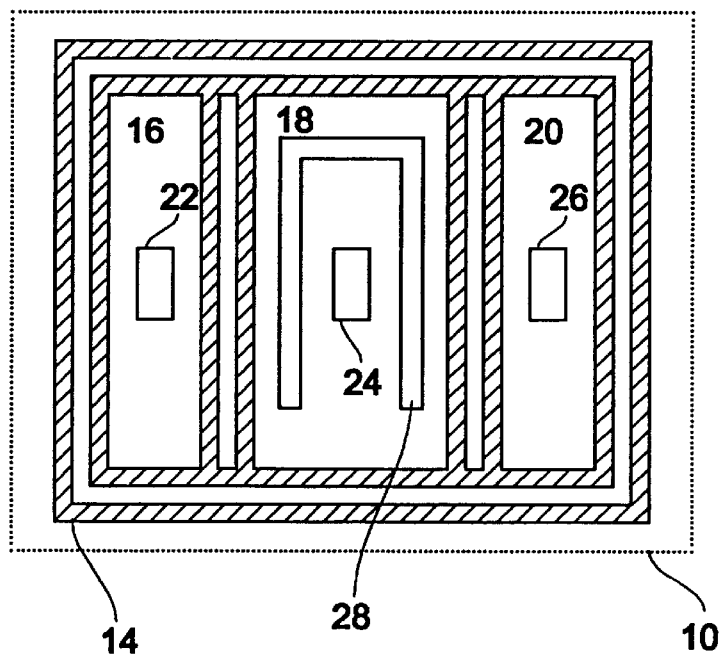
FIG. 2 shows a schematic top view of part of the flow sensor component shown in FIG. 1.

In FIGS. 1 and 2, a first embodiment of a flow sensor component according to the present invention is shown. A silicon diaphragm is formed in a silicon chip 12, e.g. by means of back etching. In the embodiment shown, filled slots 14 are arranged in the silicon diaphragm 10, the slots open at both ends 14 defining in the silicon diaphragm 10 three areas 16, 18 and 20 which are thermally insulated from one another. The filled slots extend from one main surface through the whole diaphragm 10 to a second main surface of the diaphragm. These filled slots are preferably filled with a dielectric material, which is silicon oxide in the case of the preferred embodiment. In the field of technology, such filled slots are referred to as filled layers also in the German language.

In the embodiment shown in FIGS. 1 and 2, a temperature detection element, i.e. a temperature sensor 22, 24, 26 is arranged in each of the thermally insulated areas. Furthermore, a heating element 28 is arranged in the central one of the three areas. A further temperature sensor 30 is arranged outside the thermally insulated areas.

The operating principle of a flow sensor on the basis of temperature sensors and heating elements is known to those skilled in the art and is therefore not explained in detail in the present application.

The heat flow on the silicon diaphragm 10 is adjusted by the filled slots 14 between the thermally insulated areas. Elements which are suitable to be used as a heating element are e.g. a polysilicon resistor, a diffused resistor or a transistor. To those skilled in the art, it will be obvious that it is not necessary that the heating element has the U-shape shown in FIG. 2, but that it can be arranged directly above the temperature sensor 24 which serves to detect the temperature of the heating element.

The flow sensor component according to the present invention permits additional flow direction recognition. Due to the thermal separation of the heated and of the non-heated areas by the filled slots, different temperature profiles are obtained, depending on the direction of flow, which can be measured on a diaphragm with the aid of the temperature sensors, viz. temperature sensors 22, 24, 26 and, optionally, 30 in the embodiment shown in FIG. 1. This separation of the areas, i.e. the thermal insulation of the areas, which results in an increased sensitivity of the flow sensor component, is possible due to the use of the filled slots. The temperature differences between different temperature sensors are a measure of the flow velocity and the direction of flow.

Figure 3:
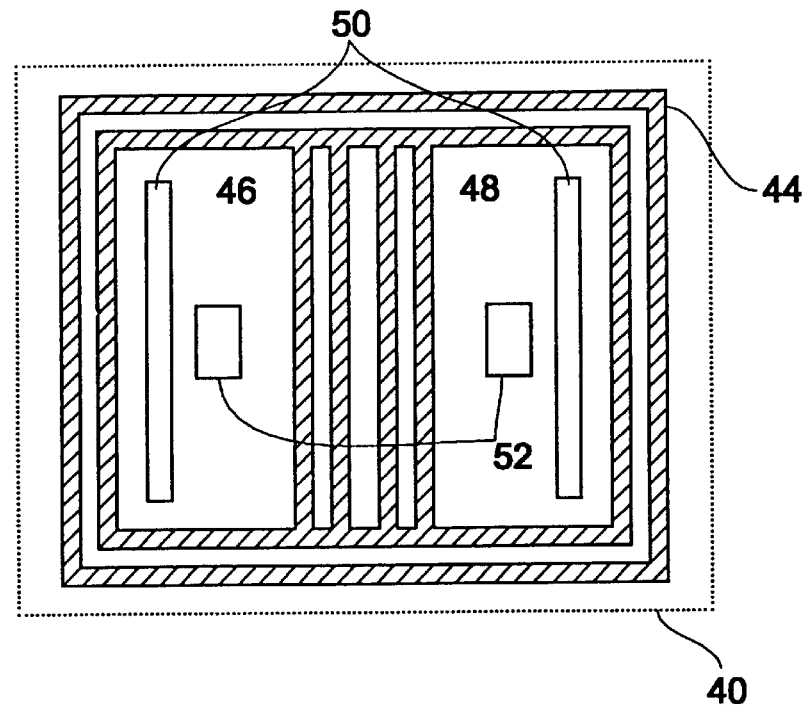
FIGS. 3 and 4 show schematic top views of parts of embodiments of further flow sensor components according to the present invention.

In FIG. 3, a schematic top view of an embodiment of a flow sensor component according to the present invention is shown, which can be used e.g. for a transit-time method for measuring the flow velocity of a medium flowing past the flow sensor component. In this embodiment two areas 46 and 48, which are thermally insulated from one another, are defined in a silicon substrate 40 by filled slots 44. Heating elements 50 and temperature sensors 52 are arranged in each of the thermally insulated areas.

As in the embodiment shown in FIG. 2, each area is completely surrounded by the filled slots 44. As in the embodiment-shown in FIG. 2, the outer surround of the thermally insulated areas is defined by a double filled slot consisting of two parallel filled slots which extend in juxtaposed, spaced relationship with one another. In the embodiment shown in FIG. 3, four parallel filled slots extending in spaced relationship with one another are, however, shown in the boundary region between the thermally insulated areas. It is apparent that the larger the number of parallel filled slots which extend in juxtaposed, spaced relationship and which are used for providing the insulation, the greater the thermal insulation of the individual areas will be. For the sake of clarity, only two or four filled slots extending in parallel are shown in the respective figures, but, in practice, a larger number of parallel filled slots, e.g. four, eight or sixteen, can be used.

In the case of transit-time methods for measuring the flow velocity of a medium flowing past a flow sensor, a heating pulse is supplied in a diaphragm area, which is thermally insulated by filled slots, by means of the heating element located in this area, and is then transported via the medium, e.g. a fluid. The heat transported in the medium can be measured at some other point of the diaphragm with the aid of a temperature sensor. The time between the heating pulse and the detection of the warmth pulse provides a measure of the flow velocity.

Figure 4:
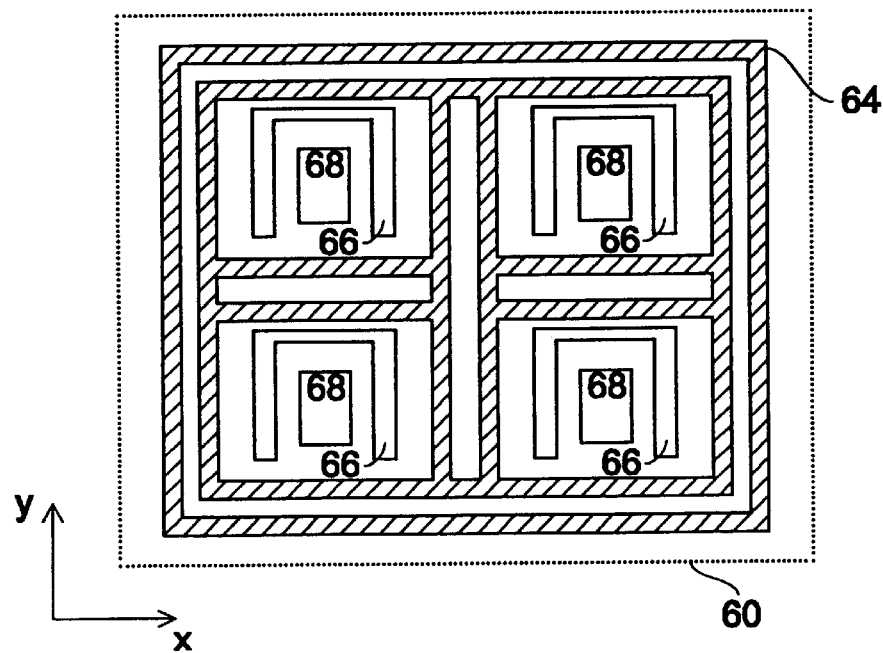

FIG. 4 shows schematically a further embodiment of a flow sensor component according to the present invention. In this embodiment four areas are defined in a substrate 60, the four areas being thermally insulated from one another by filled slots 64. A heating element 66 and a temperature sensor 68 is arranged in each area. The structural design shown in FIG. 4 permits a measurement of the flow velocity and of the flow direction not only in the x-direction but also in the y-direction.

Figure 5:
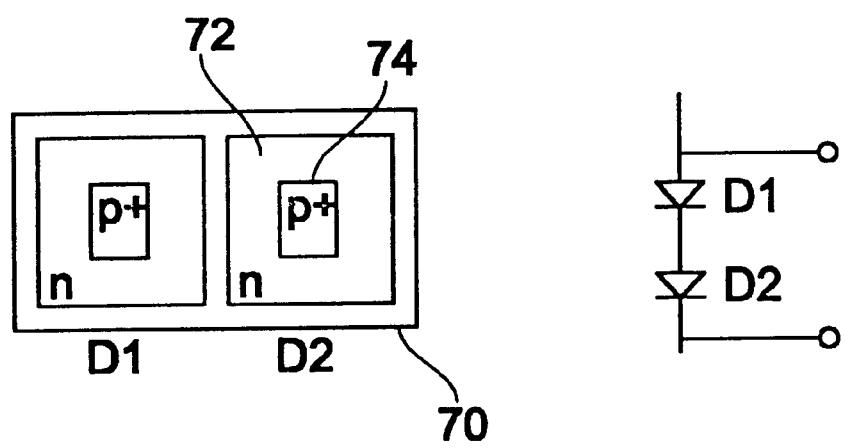
FIG. 5 shows a schematic representation of an advantageous temperature detection element.

In FIG. 5 an advantageous embodiment of a temperature detection element is shown. In addition to the normally used diffused resistors or polysilicon resistors for temperature measurement, it is also possible to use diodes in the manner known. The diodes are operated e.g. in the forward direction. According to the present invention, filled slots 70 are used in a CMOS compatible process for a series connection of at least two diodes D1 and D2 so as to increase the temperature sensitivity in comparison with one diode.

In FIG. 5, the differently doped areas, an n-region 72 and a p+-region 74, of the diodes D1 and D2 are shown. These two diodes are electrically connected in a suitable manner, e.g. above the central filled slot, so as to define the series connection of two diodes which is shown in FIG. 5 on the right-hand side. In such a series connection, the temperature sensitivities of the individual diodes are additive. Due to parasitic effects, this kind of use of the series connection of diodes in a CMOS process is normally not possible. This kind of use is only realizable by means of the filled slots 70 surrounding each of the two diodes.

It follows that the present invention provides flow sensor components which are robust, since a silicon diaphragm can be chosen thicker than a dielectric diaphragm. In addition, due to the provision of the filled slots, the flow sensor component according to the present invention shows, in comparison with pure silicon diaphragms, an increased sensitivity with regard to flow-direction recognition. Due to the use of the silicon diaphragm, it is also possible to integrate temperature-sensitive, microelectronic components into the diaphragm. Advantages of the above-described series connection of diodes with filled slots surrounding the individual diodes are the increased temperature sensitivity resulting from the addition of the individual voltages of the diodes, and the resultant increased sensitivity of the flow sensor.

What is claimed is:

1. A flow sensor component consisting of a diaphragm of monocrystalline silicon, the diaphragm having arranged therein slots opened at both ends which are filled with a thermally insulating material and which penetrate the diaphragm from a first main surface to a second main surface thereof, said filled slots defining at least one heating area of the diaphragm provided with at least one heating element and at least one detection area of said diaphragm provided with at least one temperature detection element, said filled slots thermally insulating said heating area and said detection area from one another and surrounding said heating area and said detection area completely.

2. A flow sensor component according to claim 1, wherein the filled slots are filled with a dielectric material.

3. A flow sensor component according to claim 2, wherein the filled slots are filled with silicon oxide or silicon nitride.

4. A flow sensor component according to claim 1, wherein each of the plurality of thermally insulated areas is fully surrounded by at least one filled slot.

5. A flow sensor component according to claim 1, wherein each filled slot in the diaphragm is provided with at least one further filled slot extending in juxtaposed, spaced relationship therewith.

6. A flow sensor component according to claim 1, wherein the respective thermally insulated areas are defined by a plurality of filled slots extending in parallel, juxtaposed relationship with one another.

7. A flow sensor component according to claim 1, wherein the temperature detection elements are formed by diffused resistors or polysilicon resistors.

8. A flow sensor component according to claim 1, wherein the temperature detection elements are defined by a plurality of diodes which are electrically connected in series, the individual diodes being each surrounded by a filled slot penetrating the diaphragm.

9. A flow sensor component according to claim 1, wherein the filled slots define two areas in which temperature detection elements are arranged, said two areas having defined between them a third area in which a heating resistor and a temperature detection element are arranged.

10. A flow sensor component according to claim 1, wherein the diaphragm is formed in a silicon wafer by means of back etching.

11. A flow sensor component according to claim 1, wherein the diaphragm is coated with a dielectric passivation layer, at least in the active area of the flow sensor component.

12. A flow sensor component according to claim 1, wherein the heating elements are formed by polysilicon resistors, diffused resistors or transistors.

* * * * *